(12) United States Patent
Nakamura et al.

(10) Patent No.: US 12,556,203 B2
(45) Date of Patent: Feb. 17, 2026

(54) SYMBOL JUDGEMENT APPARATUS, SYMBOL JUDGEMENT METHOD AND PROGRAM

(71) Applicant: NTT, Inc., Tokyo (JP)

(72) Inventors: Masanori Nakamura, Musashino (JP); Shuto Yamamoto, Musashino (JP); Hiroki Taniguchi, Musashino (JP); Etsushi Yamazaki, Musashino (JP); Yoshiaki Kisaka, Musashino (JP)

(73) Assignee: NTT, Inc., Tokyo (JP)

( * ) Notice: Subject to any disclaimer, the term of this patent is extended or adjusted under 35 U.S.C. 154(b) by 0 days.

(21) Appl. No.: 18/841,053

(22) PCT Filed: Mar. 2, 2022

(86) PCT No.: PCT/JP2022/008945
§ 371 (c)(1),
(2) Date: Aug. 23, 2024

(87) PCT Pub. No.: WO2023/166630
PCT Pub. Date: Sep. 7, 2023

(65) Prior Publication Data
US 2025/0175198 A1 May 29, 2025

(51) Int. Cl.
*H03M 13/45* (2006.01)
(52) U.S. Cl.
CPC .................. *H03M 13/45* (2013.01)
(58) Field of Classification Search
CPC .................................................. H03M 13/45
See application file for complete search history.

(56) References Cited

U.S. PATENT DOCUMENTS 6,504,868 B1 1/2003 Koizumi
8,751,889 B2 * 6/2014 Zhang ............... H03M 13/1128
714/751

(Continued)

FOREIGN PATENT DOCUMENTS

JP 11261452 9/1999
JP 2009225005 10/2009
JP 2020184696 11/2020

OTHER PUBLICATIONS

Falconer et al., "Adaptive Channel Memory Truncation for Maximum Likelihood Sequence Estimation," The Bell System Technical Journal, Nov. 1973, 52(9):1541-1562.

(Continued)

*Primary Examiner* — Joseph D Torres
(74) *Attorney, Agent, or Firm* — Fish & Richardson P.C.

(57) ABSTRACT

The bit log-likelihood ratio generation unit generates a bit log-likelihood ratio of the reception symbol for each bit. The symbol selection unit selects a plurality of adjacent symbols of the reception symbol. A candidate sequence generation unit generates a plurality of candidate sequences by combining adjacent symbols of time-series reception symbols. The posterior probability maximum estimation unit calculates the log-likelihood ratio of the adjacent symbol to maximize the posterior probability using the output obtained by whitening time-series data of branched reception symbols and the candidate sequences reflecting the channel response. A likelihood ratio selection unit selects the bit log likelihood to be corrected based on the bit converted from the adjacent symbol. An addition unit performs weighted addition of the selected bit log-likelihood ratio and a correction value based on a difference between the bit log-likelihood ratio and the log-likelihood ratio.

6 Claims, 8 Drawing Sheets

(56) References Cited

U.S. PATENT DOCUMENTS

| | | | |
|---|---|---|---|
| 2009/0052544 A1* | 2/2009 | Limberg | H04N 19/436 |
| | | | 375/E7.076 |
| 2009/0094499 A1* | 4/2009 | Deoka | G11B 20/18 |
| | | | 714/752 |
| 2009/0235060 A1 | 9/2009 | Yokokawa et al. | |
| 2013/0124949 A1* | 5/2013 | Zhang | H03M 13/6343 |
| | | | 714/E11.032 |
| 2022/0224575 A1 | 7/2022 | Taniguchi et al. | |

OTHER PUBLICATIONS

Zhang et al., "Up to 190-Gb/s OOK Signal Generation using a Coding and Cutting Technique with a 92 GSa/s DAC," In Proceedings of the 2017 Optical Fiber Communications Conference and Exhibition (OFC), Los Angeles, CA, USA, Mar. 19-23, 2017, 3 pages.

* cited by examiner

SYMBOL JUDGEMENT APPARATUS, SYMBOL JUDGEMENT METHOD AND PROGRAM

CROSS-REFERENCE TO RELATED APPLICATIONS

This application is a National Stage application under 35 U.S.C. § 371 of International Application No. PCT/JP2022/008945, having an International Filing Date of Mar. 2, 2022. The disclosure of the prior application is considered part of the disclosure of this application, and is incorporated by reference in its entirety into this application.

TECHNICAL FIELD

The present invention relates to a symbol judgement apparatus, a symbol judgement method and a program.

BACKGROUND ART

In recent years, multi-leveling of coherent optical transmission systems has progressed, and band narrowing due to multi-leveling and the influence of device nonlinearity on signal quality have increased. In a judgement method for determining a transmission symbol without using sequence estimation, noise enhancement occurs when the influence of band narrowing and device nonlinearity is large. Meanwhile, posterior probability maximum (MAP) estimation by sequence estimation is well known as a technique for compensating for band narrowing and device nonlinearity without noise enhancement on the reception side. However, in the MAP estimation, it is necessary to perform sequence estimation for all possible candidate sequences (all states). Therefore, the number of states increases exponentially with respect to the multivalued degree and the candidate symbol length. As described above, the MAP estimation has a problem in operation scale. Therefore, there is a technique of performing sequence estimation by limiting a candidate symbol sequence (see, for example, Patent Literature 1).

CITATION LIST

Patent Literature

Patent Literature 1: JP 2020-184696 A

SUMMARY OF INVENTION

Technical Problem

The technique of Patent Literature 1 described above is based on hard decision. Therefore, it is difficult to support a soft decision error correction code generally used in coherent optical transmission.

In view of the above circumstances, an object of the present invention is to provide a symbol judgement apparatus, a symbol judgement method and a program capable of performing soft decision while suppressing occurrence of noise enhancement and an increase in operation amount.

Solution to Problem

A symbol judgement apparatus of an aspect of the present invention includes a bit log-likelihood ratio generation unit (hereinafter also referred to as "bit log-likelihood ratio generator") that generates a bit log-likelihood ratio of a reception symbol for each bit, a symbol selection unit (hereinafter also referred to as "symbol selector") that selects a plurality of adjacent symbols of the branched reception symbol, a candidate sequence generation unit (hereinafter also referred to as "candidate sequence generator") that generates a plurality of candidate sequences by combining the adjacent symbols selected by the symbol selection unit for each of the reception symbols in a time sequence, a channel response reproduction unit (hereinafter also referred to as "channel response reproduction circuitry") that reflects a channel response in the candidate sequence, a posterior probability maximum estimation unit (hereinafter also referred to as "posterior probability maximum estimator") that calculates a log-likelihood ratio of the adjacent symbol to maximize a posterior probability using an output obtained by whitening time-series data of the branched reception symbol and the candidate sequences in which the channel response is reflected, a symbol bit conversion unit (hereinafter also referred to as "a symbol bit convertor") that converts the adjacent symbol selected by the symbol selection unit into a bit, a likelihood ratio selection unit (hereinafter also referred to as "likelihood ratio selector") that selects a bit log likelihood to be corrected among the bit log-likelihood ratios generated by the bit log-likelihood ratio generation unit based on the bit converted by the symbol bit conversion unit, and an addition unit (hereinafter also referred to as "adder") that performs weighted addition of the bit log-likelihood ratio selected by the likelihood ratio selection unit and a correction value based on a difference between the bit log-likelihood ratio and the log-likelihood ratio calculated by the posterior probability maximum estimation unit.

A symbol judgement method of an aspect of the present invention includes a bit log-likelihood ratio generation step of generating a bit log-likelihood ratio of a reception symbol for each bit, a symbol selection step of selecting a plurality of adjacent symbols of the branched reception symbol, a candidate sequence generation step of generating a plurality of candidate sequences by combining the adjacent symbols selected in the symbol selection step for each of the reception symbols in a time sequence, a channel response reproduction step of reflecting a channel response in the candidate sequence, a posterior probability maximum estimation step of calculating a log-likelihood ratio of the adjacent symbol to maximize a posterior probability using an output obtained by whitening time-series data of the branched reception symbol and the candidate sequences in which the channel response is reflected, a symbol bit conversion step of converting the adjacent symbol selected in the symbol selection step into a bit, a likelihood ratio selection step of selecting a bit log likelihood to be corrected among the bit log-likelihood ratios generated in the bit log-likelihood ratio generation step based on the bit converted in the symbol bit conversion step, and an addition step of performing weighted addition of the bit log-likelihood ratio selected in the likelihood ratio selection step and a correction value based on a difference between the bit log-likelihood ratio and the log-likelihood ratio calculated in the posterior probability maximum estimation step.

A program according to an aspect of the present invention is a program for causing a computer to function as the above-described symbol judgement apparatus.

Advantageous Effects of Invention

According to the present invention, it is possible to perform soft decision while suppressing the occurrence of noise enhancement and an increase in operation amount.

DESCRIPTION OF EMBODIMENTS

Hereinafter, embodiments of the present invention will be described in detail with reference to the drawings. A symbol judgement apparatus according to the present embodiment uses both a soft decision method that does not use sequence estimation and sequence estimation that uses tentative determination symbols. This makes it possible to cope with soft decision while suppressing the operation amount and reducing the occurrence of noise enhancement due to the influence of band narrowing and device nonlinearity. Specifically, the symbol judgement apparatus generates a replica transmission symbol sequence of the candidate signal using a symbol adjacent to the reception signal subjected to the adaptive equalization. The symbol judgement apparatus performs posterior probability maximum estimation using a replica transmission symbol sequence and a reception symbol sequence after application of a whitening filter. A symbol judgement apparatus synthesizes a soft decision value (log-likelihood ratio) by a soft decision method not using sequence estimation and a log-likelihood ratio of bits corresponding to neighboring symbols obtained by posterior probability maximum estimation. The symbol judgement apparatus limits the number of neighboring symbols used for generating a replica transmission symbol sequence, thereby suppressing the number of states in the posterior probability maximum estimation without depending on the multivalued degree. In addition, the symbol judgement apparatus can output a soft decision value for all bits.

Figure 1:
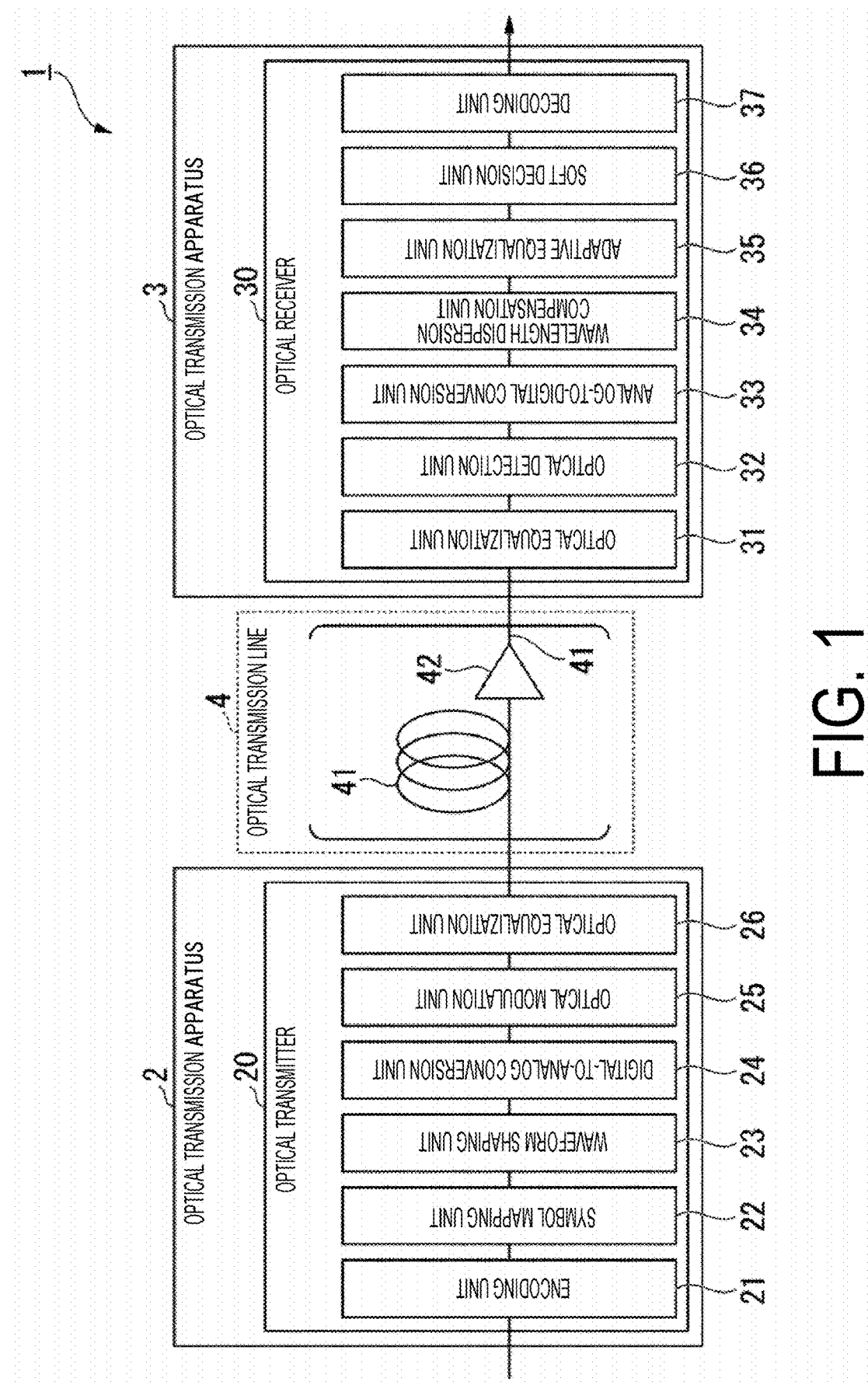
FIG. 1 is a configuration diagram of an optical transmission system according to an embodiment of the present invention.

FIG. 1 is a diagram illustrating a configuration example of an optical transmission system 1 according to an embodiment of the present invention. The optical transmission system 1 includes an optical transmission apparatus 2 and an optical transmission apparatus 3. The optical transmission apparatus 2 and the optical transmission apparatus 3 are connected by an optical transmission line 4.

The optical transmission apparatus 2 includes an optical transmitter 20. The optical transmitter 20 includes an encoding unit 21, a symbol mapping unit 22, a waveform shaping unit 23, a digital-to-analog conversion unit 24, an optical modulation unit 25, and an optical equalization unit 26. As the optical transmitter 20, an optical transmitter of a general optical transmission device such as a digital coherent optical transmission apparatus or an intensity modulation/direct detection optical transmission apparatus can be used.

The encoding unit 21 encodes the input bit sequence using an arbitrary error correction coding. The symbol mapping unit 22 maps the bit sequence input from the encoding unit 21 to an arbitrary symbol using quadrature phase shift keying (QPSK), quadrature amplitude modulation (QAM), or the like. The waveform shaping unit 23 performs Nyquist filtering or the like on the symbol sequence input from the symbol mapping unit 22. Furthermore, at this time, the waveform shaping unit 23 may pre-equalize the inverse characteristic of the transfer function of the analog device used in the optical transmitter 20 or the optical transmission line 4.

The digital-to-analog conversion unit 24 converts the symbol sequence of the digital signal input from the waveform shaping unit 23 into an analog signal. The optical modulation unit 25 converts an electrical signal of the analog signal input from the digital-to-analog conversion unit 24 into an optical signal. The optical equalization unit 26 equalizes a transmission signal that is an optical signal input from the optical modulation unit 25. The optical equalization unit 26 may equalize transfer functions of the optical transmitter 20, the optical transmission line 4, an optical receiver 30, and the like. The optical equalization unit 26 outputs the equalized optical signal to the optical transmission line 4. Note that the optical transmitter 20 may not include the optical equalization unit 26.

The optical transmission apparatus 3 is an example of a symbol judgement apparatus. The optical transmission apparatus 3 includes the optical receiver 30. The optical receiver 30 includes an optical equalization unit 31, an optical detection unit 32, an analog-to-digital conversion unit 33, a wavelength dispersion compensation unit 34, an adaptive equalization unit 35, a soft decision unit 36, and a decoding unit 37. As the optical equalization unit 31, the optical detection unit 32, the analog-to-digital conversion unit 33, the wavelength dispersion compensation unit 34, the adaptive equalization unit 35, and the decoding unit 37, those used for a receiver of a general optical transmission device such as a digital coherent optical transmission device or an intensity modulation/direct detection optical transmission device can be used.

The optical equalization unit 31 equalizes the optical signal received from the optical transmitter 20 via the optical transmission line 4. The optical equalization unit 31 may equalize transfer functions of the optical transmitter 20, the optical transmission line 4, the optical receiver 30, and the like. Note that the optical receiver 30 may not include the optical equalization unit 31. The optical detection unit 32 converts the signal modulated at the carrier frequency into a baseband analog electrical signal by coherent detection or square detection that causes interference between the optical signal equalized by the optical equalization unit 31 and the local light. The analog-to-digital conversion unit 33 converts the reception signal converted into the analog electric signal by the optical detection unit 32 into a digital signal.

The wavelength dispersion compensation unit 34 equalizes the reception signal converted into the digital signal. Specifically, the wavelength dispersion compensation unit 34 equalizes the chromatic dispersion generated in the optical transmission line 4 by digital signal processing such as finite impulse response (FIR) filter or frequency domain equalization. At this time, the wavelength dispersion compensation unit 34 may simultaneously perform waveform shaping such as compensation of a transfer function of an analog device of the optical receiver 30. The adaptive equalization unit 35 performs adaptive equalization on the reception signal equalized by the wavelength dispersion compensation unit 34. That is, the adaptive equalization unit 35 dynamically estimates and compensates for a dynamically varying polarization state, laser frequency offset/phase noise, a clock phase, and the like generated in the optical transmission line 4 by digital signal processing such as an FIR filter and frequency domain equalization. In addition, the adaptive equalization unit 35 operates a matching filter corresponding to noise added in the optical transmitter 20, the optical transmission line 4, and the optical receiver 30.

The soft decision unit 36 calculates a log-likelihood ratio that is a soft decision value of each received bit from the reception symbol sequence of the reception signal adaptively equalized by the adaptive equalization unit 35, and outputs the calculated log-likelihood ratio. A specific configuration of the soft decision unit 36 will be described later. The decoding unit 37 performs error correction on the bit sequence or the bit likelihood sequence input from the soft decision unit 36.

The optical transmission line 4 transmits the optical signal output from the optical transmitter 20 to the optical receiver 30. The optical transmission line 4 includes an optical fiber 41 and an optical amplifier 42. The optical fiber 41 connects the optical transmitter 20 or the optical amplifier 42 in the preceding stage to the optical amplifier 42 in the subsequent stage or the optical receiver 30. The optical amplifier 42 amplifies the optical signal transmitted through the optical fiber 41 on the input side and inputs the amplified optical signal to the optical fiber 41 on the output side. The number of optical amplifiers 42 is arbitrary.

Note that the optical transmission apparatus 2 may further include the optical receiver 30, and the optical transmission apparatus 3 may further include the optical transmitter 20.

Next, a symbol determination unit that performs soft decision using the related art will be described, and then the soft decision unit 36 according to the present embodiment will be described.

Figure 2:
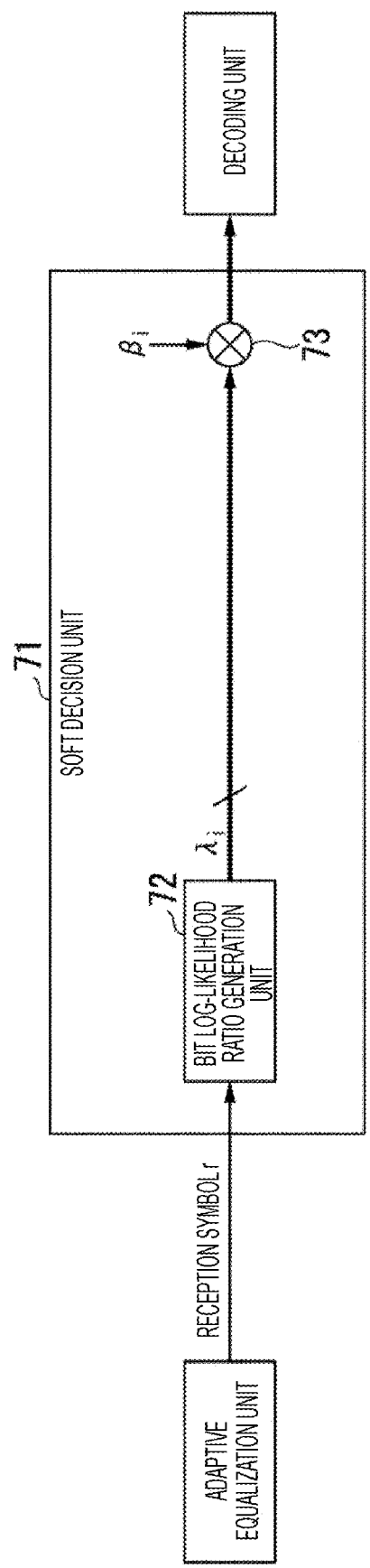
FIG. 2 is a configuration diagram of a soft decision unit using the related art.

FIG. 2 is a diagram illustrating a configuration of a soft decision unit 71. The soft decision unit 71 generates a bit log-likelihood ratio using only each symbol at a certain time without using sequence estimation. Although the processing is simple, noise emphasis occurs in a transmission/reception system greatly affected by band narrowing. The soft decision unit 71 includes a bit log-likelihood ratio generation unit 72 and a multiplication unit 73.

For example, the bit log-likelihood ratio generation unit 72 receives a reception symbol r similar to the output from the adaptive equalization unit 35 illustrated in FIG. 1. The bit log-likelihood ratio generation unit 72 generates a bit log-likelihood ratio $\lambda_i$ for each bit i from the reception symbol r, and outputs each generated log-likelihood ratio $\lambda_i$. The multiplication unit 73 multiplies the bit log-likelihood ratio $\lambda_i$ output from the bit log-likelihood ratio generation unit 72 by a scale parameter $\beta_i$ ($\beta_i$ is a real number of 0 or more). The scale parameter $\beta_i$ is a parameter for adjusting such that the number of error corrections in the subsequent stage is minimized. The multiplication unit 73 outputs the bit log-likelihood ratio $\lambda_i$ multiplied by the scale parameter $\beta_i$ to the decoding unit in the subsequent stage. The decoding unit in the subsequent stage performs, for example, the same processing as the decoding unit 37 illustrated in FIG. 1.

The bit log-likelihood ratio generation unit 72 calculates a correspondence between the reception symbol r and the log-likelihood ratio $\lambda_i$ of each bit i using Equation (1) below. Equation (1) is a formula for calculating a bit unit log-likelihood ratio (LLR) to obtain an exact solution.

[Math. 1]

$$\lambda_i = \log \left[ \frac{\sum_{s(b_i=0)} P_a(s) \exp\left\{\frac{\|r-s\|^2}{2\sigma^2}\right\}}{\sum_{s(b_i=1)} P_a(s) \exp\left\{\frac{\|r-s\|^2}{2\sigma^2}\right\}} \right] \quad (1)$$

$\sigma^2$: Disperse of noise
s: Replica signal
s ($b_i$=0 or 1): i-th bit indicates 0 or 1 symbol
$P_a(S)$: Indication of the (prior) probability of occurrence of symbol s In a case where the reception signal is a four-value signal, the bit log-likelihood ratio generation unit 72 may calculate the correspondence between the reception symbol r and the log-likelihood ratio $\lambda_i$ of each bit i using Equations (2) and (3) below. Equations (2) and (3) are approximate calculation formulas of the bit unit LLR in the four-value signal.

[Math. 2]

$$\lambda_{MSB} = \begin{cases} \frac{2r}{\sigma^2} & r \leq 2 \\ \frac{4(r-1)}{\sigma^2} & r > 2 \\ \frac{4(r+1)}{\sigma^2} & r > -2 \end{cases} \quad (2)$$

[Math. 3]

$$\lambda_{LSB} = \begin{cases} \frac{2(r-2)}{\sigma^2} & r \leq 0 \\ -\frac{2(r+2)}{\sigma^2} & r > 0 \end{cases} \quad (3)$$

The MSB is the most significant bit, and the LSB is the least significant bit. $\lambda_{MSB}$ is a bit log-likelihood ratio of the MSB, and $\lambda_{LSB}$ is a bit log-likelihood ratio of the LSB.

Alternatively, the bit log-likelihood ratio generation unit 72 may acquire the bit unit LLR as in an approximate expression using a lookup table.

Figure 3:
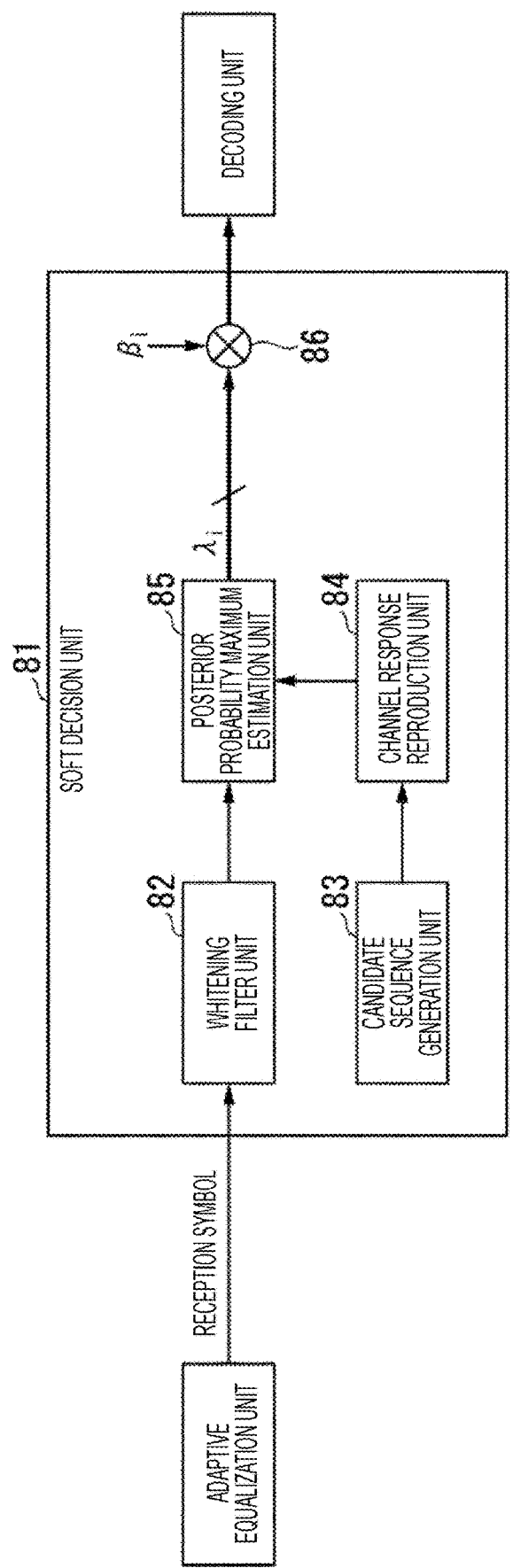
FIG. 3 is a configuration diagram of a soft decision unit using the related art.

FIG. 3 is a diagram illustrating a configuration of the soft decision unit 81 using sequence estimation. In a case where sequence estimation is used, an operation is required for all candidate sequences. The soft decision unit 81 includes a whitening filter unit 82, a candidate sequence generation unit 83, a channel response reproduction unit 84, a posterior probability maximum estimation unit 85, and a multiplication unit 86.

For example, the whitening filter unit 82 receives a reception symbol similar to the output from the adaptive equalization unit 35 illustrated in FIG. 1. The whitening filter unit 82 applies a filter that whitens the noise spectrum included in the reception signal to the reception symbol. This filter is implemented using an FIR filter or the like.

The candidate sequence generation unit 83 generates a candidate sequence that is a replica of the sequence of the transmission signal for all combinations of candidates. The channel response reproduction unit 84 applies a linear/ nonlinear filter that simulates the signal spectrum and nonlinearity after the output from the whitening filter unit 82 to each candidate sequence. The linear filter is implemented using an FIR filter or the like, and the nonlinear filter is implemented using a Volterra filter or the like.

The posterior probability maximum estimation unit 85 calculates the log-likelihood ratio $\lambda_i$ of the i-th bit of the symbol at the timing of time t by a BCJR algorithm using the output of the whitening filter unit 82 and the output from the channel response reproduction unit 84. The multiplication unit 86 multiplies the bit log-likelihood ratio $\lambda_i$ output from the posterior probability maximum estimation unit 85 by the scale parameter $\beta_i$ ($\beta_i$ is a real number of 0 or more). The scale parameter $\beta_i$ is a parameter for adjusting such that the number of error corrections in the subsequent stage is minimized.

Figure 4:
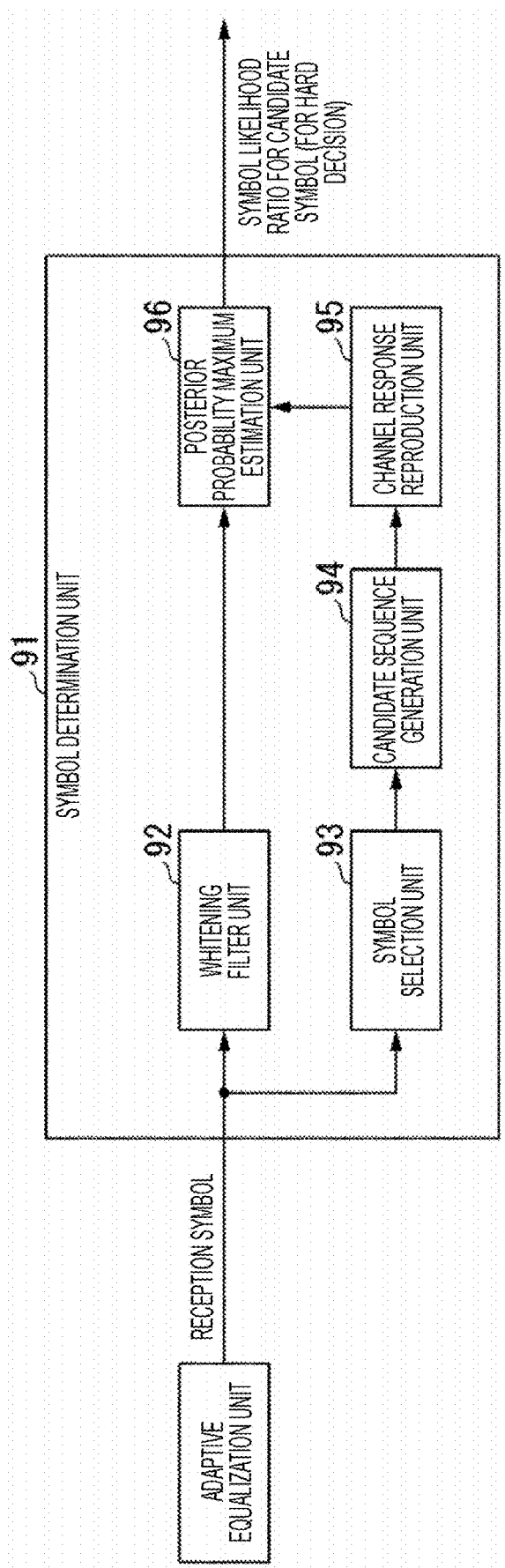
FIG. 4 is a configuration diagram of a symbol determination unit using the related art.

FIG. 4 is a diagram illustrating a configuration of the symbol determination unit 91. The symbol determination unit 91 applies, for example, the technique of Patent Literature 1. The symbol determination unit 91 outputs a symbol likelihood ratio for hard decision. The symbol determination unit 91 includes a whitening filter unit 92, a symbol selection unit 93, a candidate sequence generation unit 94, a channel response reproduction unit 95, and a posterior probability maximum estimation unit 96.

For example, the whitening filter unit 92 receives a reception symbol similar to the output from the adaptive equalization unit 35 illustrated in FIG. 1. The whitening filter unit 92 applies a filter that whitens the noise spectrum included in the reception signal to the reception symbol. This filter is implemented using an FIR filter or the like.

The symbol selection unit 93 performs provisional determination on the reception signal and selects a candidate symbol of the reception symbol. The candidate symbols are the nearest adjacent symbol of the reception symbol, the next nearest adjacent symbol, the next nearest adjacent symbol, . . . . The candidate sequence generation unit 94 generates a candidate sequence by combining candidate symbols selected by the symbol selection unit 93 for symbols at each time in time series. The channel response reproduction unit 95 applies a linear/nonlinear filter that simulates the signal spectrum and nonlinearity after the output from the whitening filter unit 92. The linear filter is implemented using an FIR filter or the like, and the nonlinear filter is implemented using a Volterra filter or the like.

The posterior probability maximum estimation unit 96 calculates the symbol likelihood ratio between the candidate symbols at the timing of time t by the BCJR algorithm using the output of the whitening filter unit 92 and the output from the channel response reproduction unit 95.

Figure 5:
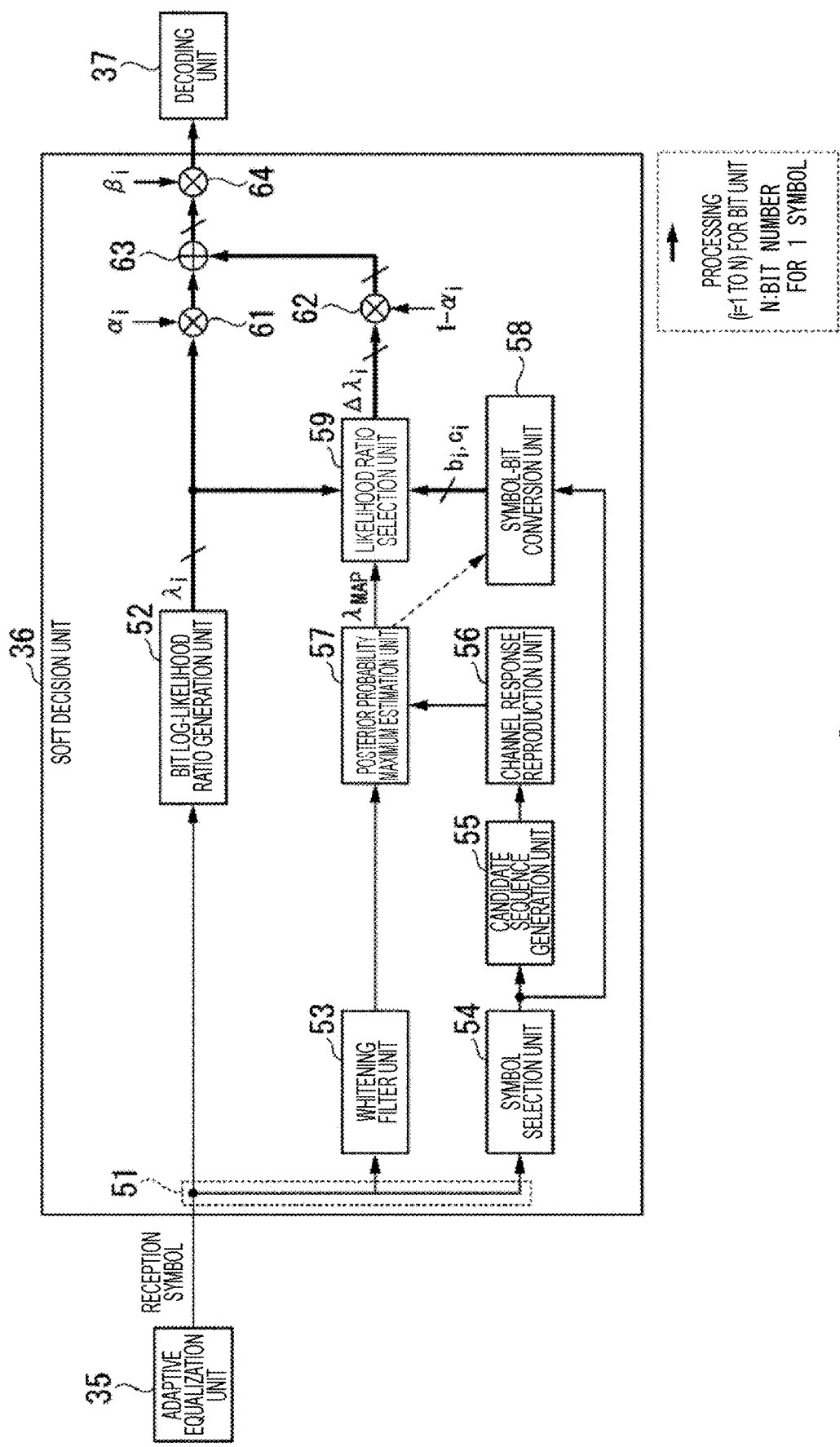
FIG. 5 is a configuration diagram of a soft decision unit according to the embodiment.

FIG. 5 is a diagram illustrating a configuration of the soft decision unit 36 according to the present embodiment. The soft decision unit 36 includes a branching unit 51, a bit log-likelihood ratio generation unit 52, a whitening filter unit 53, a symbol selection unit 54, a candidate sequence generation unit 55, a channel response reproduction unit 56, a posterior probability maximum estimation unit 57, a symbol-bit conversion unit 58, a likelihood ratio selection unit 59, a weighting unit 61, a weighting unit 62, an addition unit 63, and a multiplication unit 64. As the bit log-likelihood ratio generation unit 52, a bit log-likelihood ratio generation unit 72 illustrated in FIG. 2 can be used. As the whitening filter unit 53, the symbol selection unit 54, the candidate sequence generation unit 55, the channel response reproduction unit 56, and the posterior probability maximum estimation unit 57, the whitening filter unit 92, the symbol selection unit 93, the candidate sequence generation unit 94, the channel response reproduction unit 95, and the posterior probability maximum estimation unit 96 illustrated in FIG. 4 can be used.

The branching unit 51 inputs the reception symbols of the reception signal output from the adaptive equalization unit 35 in time series, and branches into three. The branching unit 51 outputs the three branched reception symbols to the bit log-likelihood ratio generation unit 52, the whitening filter unit 53, and the symbol selection unit 54.

The bit log-likelihood ratio generation unit 52 calculates the bit log-likelihood ratio $\lambda_i$ of each bit i from the reception symbol without using sequence estimation. When the number of bits of the value represented by one symbol is N, it is established that i=1 to N. Any related art can be used to calculate the bit log-likelihood ratio $\lambda_i$.

The whitening filter unit 53 applies a filter that whitens a frequency spectrum of noise to time-series reception symbols. The whitening filter unit 53 outputs the symbol after filter application.

The symbol selection unit 54 selects a (a is an integer of 2 or more) candidate symbols for the reception symbol by provisional determination. Hereinafter, a case where a=2 will be described as an example. The symbol selection unit 54 selects a nearest adjacent symbol closest to the reception symbol r(t) and a next nearest adjacent symbol second closest to the reception symbol r(t). The symbol selection unit 54 outputs the selected candidate symbol to the candidate sequence generation unit 55 and the symbol-bit conversion unit 58.

The candidate sequence generation unit 55 combines the candidate symbols selected by the symbol selection unit 54 to generate a plurality of candidate sequences in which time-series candidate symbols are arranged. The channel response reproduction unit 56 applies a channel response reproduced by a linear filter, a nonlinear filter, or the like to each candidate sequence generated by the candidate sequence generation unit 55.

Based on the output of the whitening filter unit 53 and the output from the channel response reproduction unit 56, the posterior probability maximum estimation unit 57 calculates the posterior probability in consideration of the peripheral sequence between the nearest adjacent symbol and the next nearest adjacent symbol using the BCJR algorithm or the like. The posterior probability maximum estimation unit 57 outputs a symbol log-likelihood ratio $\lambda_{MAP}$ obtained by the logarithm of the ratio of the posterior probability of the nearest adjacent symbol to the posterior probability of the next nearest adjacent symbol.

The symbol-bit conversion unit 58 converts each of the nearest adjacent symbol and the next nearest adjacent symbol selected by the symbol selection unit 54 into a bit string of values represented by the symbols. The symbol-bit conversion unit 58 outputs each bit $b_i$ converted from the nearest adjacent symbol and each bit $c_i$ converted from the next nearest adjacent symbol to the likelihood ratio selection unit 59.

The likelihood ratio selection unit 59 calculates a correction value $\Delta\lambda_i$ by Equation (4) below using the bit log-likelihood ratio $\lambda_i$ output from the bit log-likelihood ratio generation unit 52, the symbol log-likelihood ratio $\lambda_{MAP}$ output from the posterior probability maximum estimation unit 57, and the bit $b_i$ of the nearest adjacent symbol and the bit $c_i$ of the next nearest adjacent symbol output from the symbol-bit conversion unit 58.

$$\Delta \lambda_i = (b_i - c_i)(\lambda_i - \lambda_{MAP}) \quad (4)$$

When the bit $b_i$ of the nearest adjacent symbol and the bit $c_i$ of the next nearest adjacent symbol are the same, $(b_i-c_i)$ is 0. In this case, since the correction value $\Delta\lambda_i$ is 0, the correction value $\Delta\lambda_i$ is not used to correct the bit log-likelihood ratio $\lambda_i$ output from the bit log-likelihood ratio generation unit 52. This corresponds to the fact that bit i is not selected as a target for correcting the bit log-likelihood ratio $\lambda_i$. In a case where the bit $b_i$ of the nearest adjacent symbol and the bit $c_i$ of the next nearest adjacent symbol are different, $(b_i-c_i)$ is $-1$ or 1. In this case, the correction value $\Delta\lambda_i$ is used to correct the bit log-likelihood ratio $\lambda_i$ of the bit i output from the bit log-likelihood ratio generation unit 52. This corresponds to the fact that bit i is selected as a target for correcting the bit log-likelihood ratio $\lambda_i$. The likelihood ratio selection unit 59 outputs the calculated correction value $\Delta\lambda_i$.

The weighting unit 61 multiplies a log-likelihood ratio $\lambda_i$ output from the bit log-likelihood ratio generation unit 52 by $\alpha_i$ ($\alpha_i$ is a real number between 0 and 1). The weighting unit 62 multiplies the correction value $\Delta\lambda_i$ output from the likelihood ratio selection unit 59 by $(1-\alpha_i)$. The addition unit 63 adds the bit log-likelihood ratio $\lambda_i$ weighted by the weighting unit 61 using the $\alpha_i$ and the correction value $\Delta\lambda_i$ weighted by the weighting unit 62 using $(1-\alpha_i)$. The addition unit 63 outputs the bit log-likelihood ratio of the addition result to the multiplication unit 64. The multiplication unit 64 multiplies the bit log-likelihood ratio output by the addition unit 63 by the scale parameter $\beta_i$ ($\beta_i$ is a real number of 0 or more). The scale parameter $\beta_i$ is a parameter for adjusting such that the number of error corrections in the subsequent stage is minimized. The multiplication unit 64 outputs the multiplication result to the decoding unit 37.

Note that, in a case of $\alpha_i=1$, the operation is the same as the soft decision in a case where the sequence estimation is not used. $\alpha_i$ is adjusted according to the optical transmission line 4 so that the amount of information to the decoding unit 37 is maximized.

A specific operation example of the soft decision unit 36 will be described. The branching unit 51 branches the reception symbol r output from the adaptive equalization unit 35 into three. The reception symbol r has a $2^N$ value. Hereinafter, the reception symbol r received at the time t is referred to as a reception symbol r(t). The branching unit 51 outputs the three branched reception symbols r(t) to the bit log-likelihood ratio generation unit 52, the whitening filter unit 53, and the symbol selection unit 54.

The bit log-likelihood ratio generation unit 52 calculates a bit log-likelihood ratio $\lambda_i$ of each bit i (i is an integer between 1 and N) in a case where the value represented by the reception symbol r(t) is converted into a bit string having an N-bit length.

A tap length of the filter included in the whitening filter unit 53 is k. In this case, the whitening filter unit 53 outputs the symbol after the filter application using k time-series reception symbols r. Here, the tap length k=3. The whitening filter unit 53 outputs the symbol w(t) after the filter application using the reception symbol r(t−1), the reception symbol r(t), and the reception symbol r(t+1).

Figure 6:
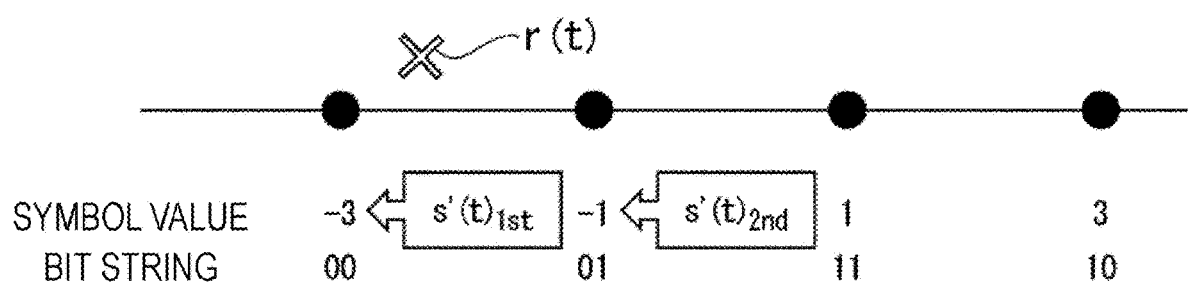
FIG. 6 is a diagram illustrating selection of a candidate symbol according to the embodiment.

FIG. 6 is a diagram illustrating selection of candidate symbols in the symbol selection unit 54. The symbol selection unit 54 selects the nearest adjacent symbol $s'(t)_{1st}$ and the next adjacent symbol $s'(t)_{2nd}$ of the reception symbol r(t) as candidate symbols. The symbol selection unit 54 outputs the selected candidate symbol to the candidate sequence generation unit 55 and the symbol-bit conversion unit 58.

For example, in a case where the constraint length in the posterior probability maximum estimation is 3, the candidate sequence generation unit 55 generates eight candidate sequences by combining the candidate sequences of the reception symbol r(t−1), the reception symbol r(t), and the reception symbol r(t+1) of three time sequences. Specifically, the candidate sequence $x_1(t)=s'(t-1)_{1st}s'(t)_{1st}s'(t+1)_{1st}$, the candidate sequence $x_2(t)=s'(t-1)_{1st}s'(t)_{1st}s'(t+1)_{2nd}$, the candidate sequence $x_3(t)=s'(t-1)_{1st}s'(t)_{2nd}s'(t+1)_{1st}$, the candidate sequence $x_4(t)=s'(t-1)_{1st}s'(t)_{2nd}s'(t+1)_{2nd}$, and the candidate sequence $x_8(t)=s'(t-1)_{2nd}s'(t)_{2nd}s'(t+1)_{2nd}$ are generated.

The channel response reproduction unit 56 applies the channel response to each of the candidate sequences $x_1(t)$ to $x_8(t)$ to generate candidate sequences $y_1(t)$ to $y_8(t)$. The candidate sequences $y_1(t)$ to $y_8(t)$ correspond to symbol sequences of the replica transmission signal. The channel response reproduction unit 56 outputs the generated candidate sequences $y_1(t)$ to $y_8(t)$ to the posterior probability maximum estimation unit 57.

The posterior probability maximum estimation unit 57 obtains the posterior probability $P(t)_{1st}$ of the nearest adjacent symbol $s'(t)_{1st}$ and the posterior probability $P(t)_{2nd}$ of the next nearest adjacent symbol $s'(t)_{2nd}$ by posterior probability maximum estimation using the symbol w(t) output from the whitening filter unit 53 and the candidate sequences $y_1(t)$ to $y_8(t)$ output from the channel response reproduction unit 56.

Figure 7:
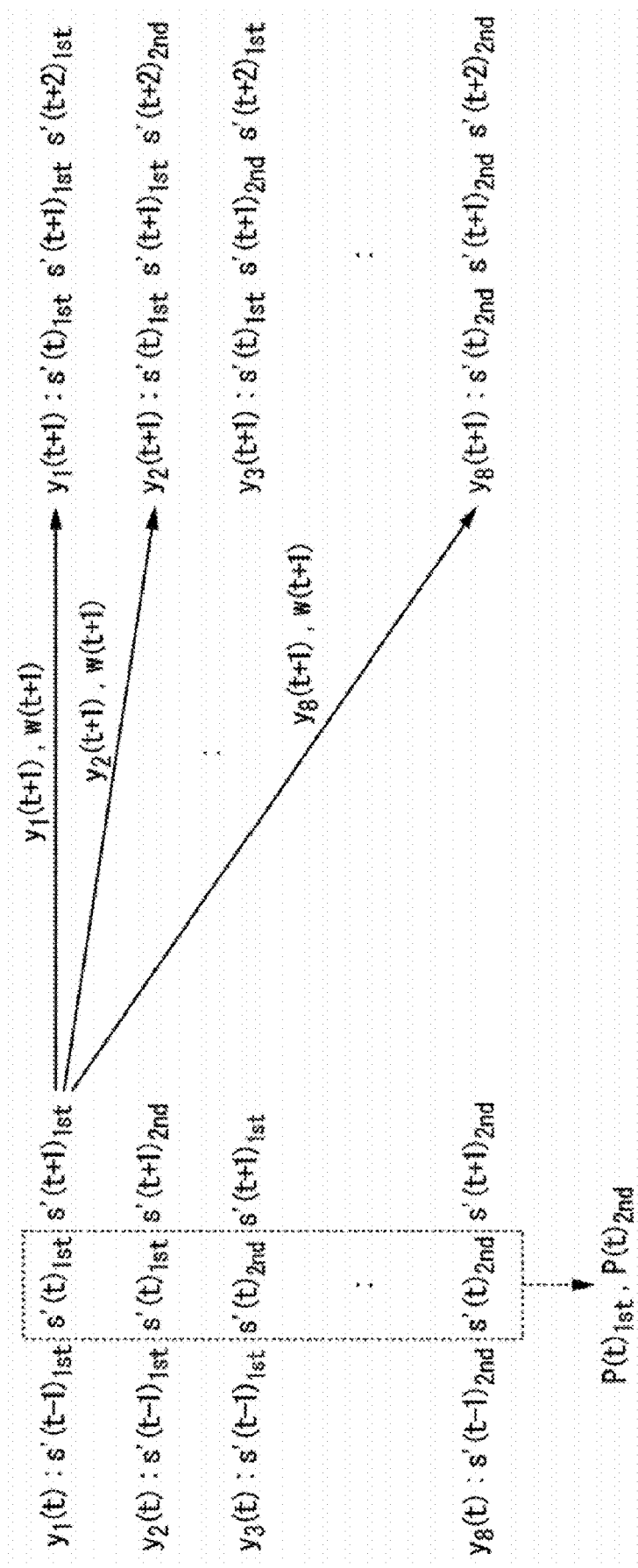
FIG. 7 is a diagram illustrating a trellis diagram according to the embodiment.

FIG. 7 is a diagram illustrating a trellis diagram in the posterior probability maximum estimation executed by the posterior probability maximum estimation unit 57. In the posterior probability maximum estimation, the posterior probability maximum estimation unit 57 obtains a forward transition probability of transition from a candidate sequence $y_u(t)$ to the candidate sequence $y_v(t+1)$ in a case where the candidate sequence $y_v(t+1)$ and the symbol w(t+1) are given (u and v are integers of 1 or more and 8 or less). In addition, the posterior probability maximum estimation unit 57 obtains a backward transition probability of transition from the candidate sequence $y_u(t+1)$ to the candidate sequence $y_v(t)$. Furthermore, the posterior probability maximum estimation unit 57 updates the forward transition probability with the backward transition probability. The posterior probability maximum estimation unit 57 uses the forward transition probability and the backward transition probability obtained for the candidate sequences $y_1(t)$ to $y_8(t)$ and the candidate sequences $y_1(t+1)$ to $y_8(t+1)$ to obtain a likelihood $P(t)_{1st}$ that is the posterior probability of the nearest adjacent symbol $s'(t)_{1st}$ and a likelihood $P(t)_{2nd}$ that is the posterior probability of the next nearest adjacent symbol $s'(t)_{2nd}$. The posterior probability maximum estimation unit 57 outputs a symbol log-likelihood ratio $\lambda_{MAP}=\log(P(t)_{1st}/P(t)_{2nd})$ between the nearest adjacent symbol and the next nearest adjacent symbol. As described above, in the present embodiment, the candidate sequence is limited to the adjacent of the reception signal. In addition, the number of states does not increase depending on the multivalued degree of the symbol. Therefore, the calculation amount of the posterior probability maximum estimation can be reduced.

The symbol-bit conversion unit 58 outputs the bit $b_i$ converted from the nearest adjacent symbol $s'(t)_{1st}$ and the bit $c_i$ converted from the next nearest adjacent symbol $s'(t)_{2nd}$ to the likelihood ratio selection unit 59.

The likelihood ratio selection unit 59 calculates the correction value $\Delta\lambda_i$ corresponding to the i-th bit of the bit string represented by the reception symbol r(t) by Equation (4) using the bit log-likelihood ratio $\lambda_i$, the symbol log-likelihood ratio $\lambda_{MAP}$, the bit $b_i$ of the nearest adjacent symbol, and the bit $c_i$ of the next nearest adjacent symbol.

The addition unit 63 adds the bit log-likelihood ratio $\lambda_i$ weighted by $\alpha_i$ and the correction value $\Delta\lambda_i$ weighted by $(1-\alpha_i)$. The multiplication unit 64 multiplies the bit log-likelihood ratio output from the addition unit 63 by the scale parameter $\beta_i$ ($\beta_i$ is a real number of 0 or more) and outputs the result.

In the above description, the case where the number a of candidate symbols is two has been described as an example. In a case where a is 3 or more, the symbol selection unit 54 selects a adjacent symbols of a first adjacent symbol, a second adjacent symbol, . . . , and an a-th adjacent symbol in the order of adjacent to the reception symbol. In this case, the posterior probability maximum estimation unit 57 calculates the posterior probability of each of the first adjacent symbol to the a-th adjacent symbol in the posterior probability maximum estimation. The posterior probability maximum estimation unit 57 selects two adjacent symbols having a large posterior probability from the first adjacent symbol to the a-th adjacent symbol. The posterior probability maximum estimation unit 57 uses the selected two adjacent symbols as the nearest adjacent symbol and the next adjacent symbol, and performs processing similar to the above-described embodiment. Note that the posterior probability maximum estimation unit 57 notifies the selected nearest adjacent symbol and the selected nearest adjacent symbol as the next nearest adjacent symbol to the symbol-bit conversion unit 58. Based on the notification from the posterior probability maximum estimation unit 57, the symbol-bit conversion unit 58 selects the nearest adjacent symbol and the nearest adjacent symbol to be used as a next nearest adjacent symbol from among the first nearest adjacent symbol, the second nearest adjacent symbol, . . . , and the a-th nearest adjacent symbol received from the symbol selection unit 54.

Figure 8:
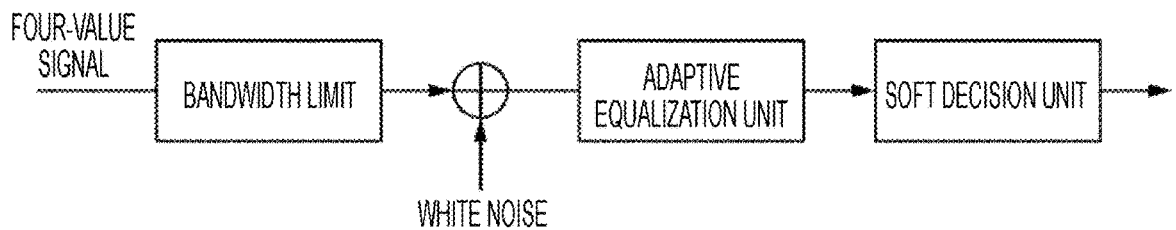
FIG. 8 is a diagram illustrating a numerical simulation system.

Next, a result of evaluating the generalized information amount by numerical simulation using the four-value signal will be described. FIG. 8 is a diagram illustrating the numerical simulation system. White noise was added to the band-limited four-value signal and input to the adaptive equalization unit. The soft decision unit 36 of the present embodiment, the soft decision unit 71 of the related art illustrated in FIG. 2, and the soft decision unit 81 of the related art illustrated in FIG. 3 perform soft decision on the signal equalized by the adaptive equalization unit.

Figure 9:
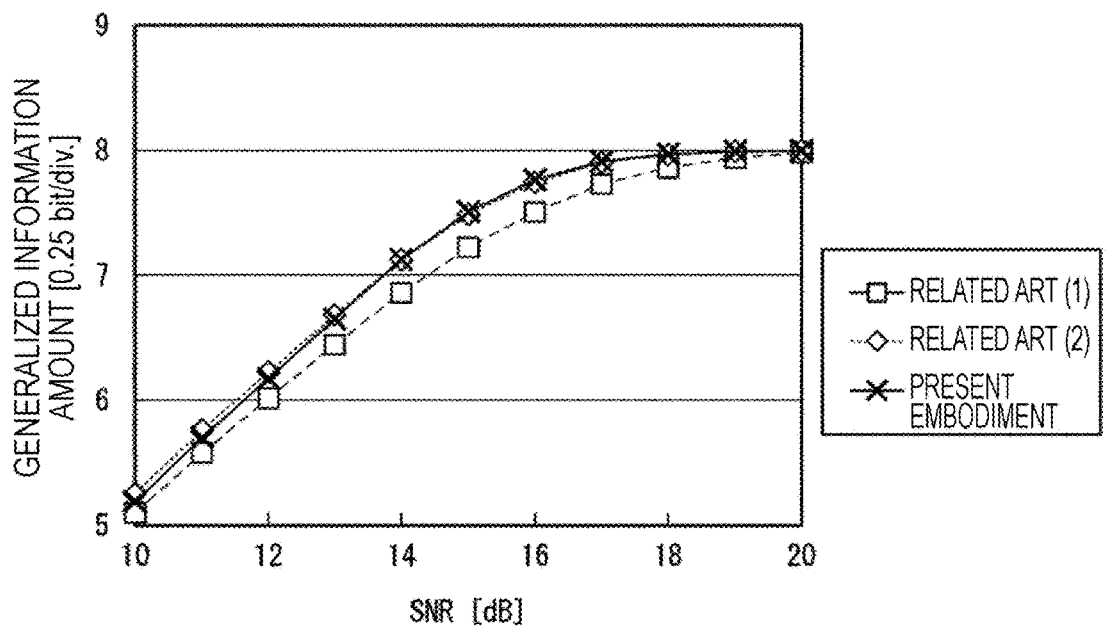
FIG. 9 is a diagram illustrating evaluation results by numerical simulation.

FIG. 9 is a diagram illustrating a generalized information amount of a soft decision result by each of the soft decision unit 36 of the present embodiment and the soft decision units 71 and 81 of the related art. Related Art (1) indicates the soft decision unit 71, and Related Art (2) indicates the soft decision unit 81. As illustrated in FIG. 9, it can be confirmed that a high information amount can be obtained using the soft decision unit 36 of the present embodiment as compared with Related Art (1) that does not use sequence estimation. In addition, it has been confirmed by the soft decision unit 36 of the present embodiment that information amount performance equivalent to that of Related Art (2) that calculates the posterior probability of sequence transition for all symbols has been obtained. The number of states for the memory length 5 is $4^{5-1}$ in Related Art (2), and $2^{5-1}$ in the soft decision unit 36 of the present embodiment.

Figure 10:
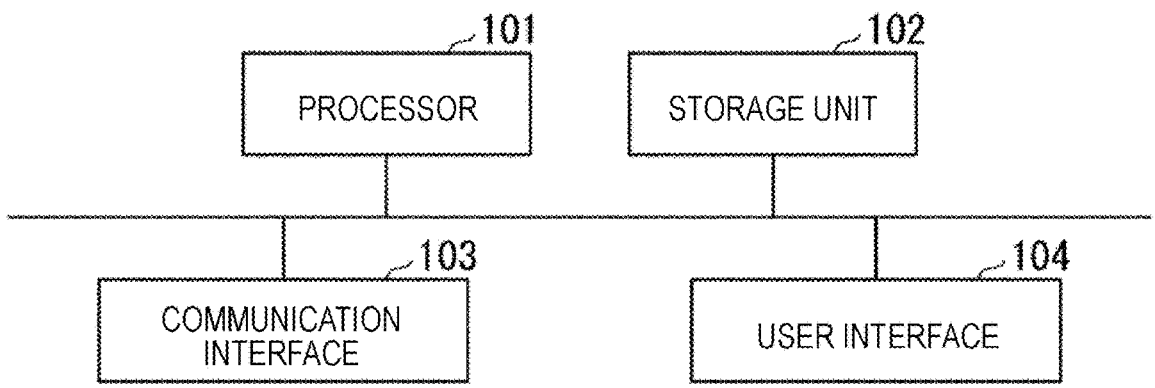
FIG. 10 is a diagram illustrating a hardware configuration of an optical transmission apparatus according to the embodiment.

FIG. 10 is a apparatus configuration diagram illustrating a hardware configuration example of the optical transmission apparatus 3. The optical transmission apparatus 3 includes a processor 101, a storage unit 102, a communication interface 103, and a user interface 104.

The processor 101 is a central processing device that performs operation and control. The processor 101 is a CPU, for example. The processor 101 reads and executes the program from the storage unit 102. The storage unit 102 further includes a work area and the like to be used when the processor 101 executes various programs. The communication interface 103 is communicably connected to another device. The communication interface includes the optical equalization unit 31, the optical detection unit 32, and the analog-to-digital conversion unit 33. The user interface 104 is an input device such as a keyboard, a pointing device (a mouse, a tablet, etc.), buttons, a touch panel, or a display device such as a display. Manual operations are input through the user interface 104.

All or some of the functions of the wavelength dispersion compensation unit 34, the adaptive equalization unit 35, the soft decision unit 36, and the decoding unit 37 are implemented by the processor 101 reading and executing a program from the storage unit 102. Note that some or all of these functions may be implemented by using hardware such as an application specific integrated circuit (ASIC), a programmable logic device (PLD), or a field programmable gate array (FPGA).

According to the above-described embodiment, the symbol judgement apparatus includes a bit log-likelihood ratio generation unit, a symbol selection unit, a candidate sequence generation unit, a channel response reproduction unit, a posterior probability maximum estimation unit, a symbol bit conversion unit, a likelihood ratio selection unit, and an addition unit. The bit log-likelihood ratio generation unit generates a bit log-likelihood ratio of the reception symbol for each bit. For example, the bit log-likelihood ratio generation unit generates the bit log-likelihood ratio of the reception symbol without using sequence estimation. The symbol selection unit selects a plurality of adjacent symbols of the branched reception symbol. The candidate sequence generation unit generates a plurality of candidate sequences by combining the adjacent symbols selected by the symbol selection unit for each of the time-series reception symbols. The channel response reproduction unit reflects the channel response in the candidate sequence. The posterior probability maximum estimation unit calculates the log-likelihood ratio of the adjacent symbol to maximize the posterior probability using the output obtained by whitening time-series data of branched reception symbols and the candidate sequence reflecting the channel response. The symbol bit conversion unit converts the adjacent symbol selected by the symbol selection unit into a bit. Based on the bits converted by the symbol bit conversion unit, the bit log likelihood to be corrected is selected from the bit log-likelihood ratios generated by the bit log-likelihood ratio generation unit. The addition unit performs weighted addition of the bit log-likelihood ratio selected by the likelihood ratio selection unit and the correction value based on the difference between the bit log-likelihood ratio and the log-likelihood ratio calculated by the posterior probability maximum estimation unit.

The symbol selection unit may select a nearest adjacent symbol and a next nearest adjacent symbol of the branched reception symbol as the nearest adjacent symbols. In a case where a bit obtained by converting the nearest adjacent symbol is different from a bit obtained by converting the next nearest adjacent symbol, the likelihood ratio selection unit selects a bit log-likelihood ratio corresponding to the bit as a correction target.

The symbol selection unit may select three or more adjacent symbols of the branched reception symbols. The posterior probability maximum estimation unit calculates the likelihood of each of the adjacent symbols to maximize the posterior probability using the output obtained by whitening the time-series data of the branched reception symbol and the candidate sequences to which the channel response is added by the channel response reproduction unit, and calculates the log-likelihood ratio of the two adjacent symbols selected based on the calculated likelihood. The symbol bit conversion unit converts the two adjacent symbols selected by the posterior probability maximum estimation unit into bits.

As described above, the embodiments of the present invention have been described in detail with reference to the drawings; however, specific configurations are not limited to these embodiments and include designs or the like without departing from the gist of the present invention.

REFERENCE SIGNS LIST

1 Optical transmission system
2 Optical transmission apparatus
3 Optical transmission apparatus
4 Optical transmission line
20 Optical transmitter
21 Encoding unit
22 Symbol mapping unit
23 Waveform shaping unit
24 Digital-to-analog conversion unit
25 Optical modulation unit
26 Optical equalization unit
30 Optical receiver
31 Optical equalization unit
32 Optical detection unit
33 Analog-to-digital conversion unit
34 Wavelength dispersion compensation unit
35 Adaptive equalization unit
36 Soft decision unit
37 Decoding unit
41 Optical fiber
42 Optical amplifier
51 Branching unit
52 Bit log-likelihood ratio generation unit
53 Whitening filter unit
54 Symbol selection unit
55 Candidate sequence generation unit
56 Channel response reproduction unit
57 Posterior probability maximum estimation unit
58 Symbol-bit conversion unit
59 Likelihood ratio selection unit
61 Weighting unit
62 Weighting unit
63 Addition unit
64 Multiplication unit
71 Soft decision unit
72 Bit log-likelihood ratio generation unit
73 Multiplication unit
81 Soft decision unit
82 Whitening filter unit
83 Candidate sequence generation unit
84 Channel response reproduction unit
85 Posterior probability maximum estimation unit
86 Multiplication unit
91 Symbol determination unit
92 Whitening filter unit
93 Symbol selection unit
94 Candidate sequence generation unit
95 Channel response reproduction unit
96 Posterior probability maximum estimation unit
101 Processor
102 Storage unit
103 Communication interface
104 User interface

The invention claimed is:

1. A symbol judgement apparatus comprising:
a branching circuitry that branches reception symbols into a first branched reception symbol, a second branched reception symbol, and a third branched reception symbol;
a bit log-likelihood ratio generator that generates a bit log-likelihood ratio of the first branched reception symbol for each bit;
a symbol selector that selects a plurality of adjacent symbols of the second branched reception symbol;
a candidate sequence generator that generates a plurality of candidate sequences by combining the plurality of adjacent symbols which have been selected by the symbol selector for each of the second branched reception symbols in a time sequence;
a channel response reproduction circuitry that reflects a channel response in the plurality of candidate sequences;
a posterior probability maximum estimator that calculates an estimated log-likelihood ratio of each of the plurality of adjacent symbols to maximize a posterior probability using a symbol obtained by whitening time-series data of the third branched reception symbol and the plurality of candidate sequences in which the channel response has been reflected;
a symbol bit convertor that converts each of the plurality of adjacent symbols which have been selected by the symbol selector into bit sequences;
a likelihood ratio selector that determines whether the bit log-likelihood ratio which has been generated by the bit log-likelihood ratio generator is a target bit log-likelihood ratio to be corrected based on corresponding bits in the bit sequences which have been converted by the symbol bit convertor; and
an adder that performs weighted addition of the target bit log-likelihood ratio which has been determined by the likelihood ratio selector and a correction value based on a difference between the target bit log-likelihood ratio and the estimated log-likelihood ratio which has been calculated by the posterior probability maximum estimator.

2. The symbol judgement apparatus according to claim 1, wherein
the bit log-likelihood ratio generator generates the bit log-likelihood ratio of the first branched reception symbol without using sequence estimation.

3. The symbol judgement apparatus according to claim 1, wherein
the symbol selector selects a nearest adjacent symbol and a next nearest adjacent symbol of the second branched reception symbol as the plurality of adjacent symbols, and
the likelihood ratio selector determines selects the bit log-likelihood ratio as the target bit log-likelihood ratio in a case where a corresponding bit in one of the bit sequences into which the nearest adjacent symbol has been converted is different from a corresponding bit in one of the bit sequences into which the next nearest adjacent symbol has been is converted.

4. The symbol judgement apparatus according to claim 1, wherein
the symbol selector selects three or more adjacent symbols of the second branched reception symbol,
the posterior probability maximum estimator calculates the estimated log-likelihood ratio of each of the three or more adjacent symbols to maximize a posterior probability using the symbol obtained by whitening time-series data of the third branched reception symbol and the plurality of candidate sequences in which the channel response has been reflected, and calculates a log-likelihood ratio of each of two adjacent symbols selected based on the estimated log-likelihood ratio of each of the three or more adjacent symbols, and
the symbol bit convertor converts each of the two adjacent symbols which have been selected by the posterior probability maximum estimator into bit sequences.

5. A symbol judgement method comprising:
branching reception symbols into a first branched reception symbol, a second branched reception symbol, and a third branched reception symbol;
generating a bit log-likelihood ratio of the first branched reception symbol for each bit;
selecting a plurality of adjacent symbols of the second branched reception symbol;
generating a plurality of candidate sequences by combining the plurality of adjacent symbols for each of the second branched reception symbols in a time sequence;
reflecting a channel response in the plurality of candidate sequences;
calculating an estimated log-likelihood ratio of each of the plurality of adjacent symbols to maximize a posterior probability using a symbol obtained by whitening time-series data of the third branched reception symbol and the plurality of candidate sequences in which the channel response has been reflected;
converting each of the plurality of adjacent symbols into bit sequences;
determining whether the bit log-likelihood ratio is a target bit log-likelihood ratio to be corrected based on the corresponding bits in bit sequences; and
performing weighted addition of the target bit log-likelihood ratio and a correction value based on a difference between the target bit log-likelihood ratio and the estimated log-likelihood ratio.

6. A non-transitory computer readable medium which stores a program which, when executed by a computer, causes the computer to perform:
branching reception symbols into a first branched reception symbol, a second branched reception symbol, and a third branched reception symbol;
generating a bit log-likelihood ratio of the first branched reception symbol for each bit;
selecting a plurality of adjacent symbols of the second branched reception symbol;
generating a plurality of candidate sequences by combining the plurality of adjacent symbols for each of the second branched reception symbols in a time sequence;
reflecting a channel response in the plurality of candidate sequences;
calculating an estimated log-likelihood ratio of each of the plurality of adjacent symbols to maximize a posterior probability using a symbol obtained by whitening time-series data of the third branched reception symbol and the plurality of candidate sequences in which the channel response has been reflected;
converting each of the plurality of adjacent symbols into bit sequences;
determining whether the bit log-likelihood ratio is a target bit log-likelihood ratio to be corrected based on the corresponding bits in bit sequences; and
performing weighted addition of the target bit log-likelihood ratio and a correction value based on a difference between the target bit log-likelihood ratio and the estimated log-likelihood ratio.

\* \* \* \* \*